United States Patent Office 3,436,976
Patented Apr. 8, 1969

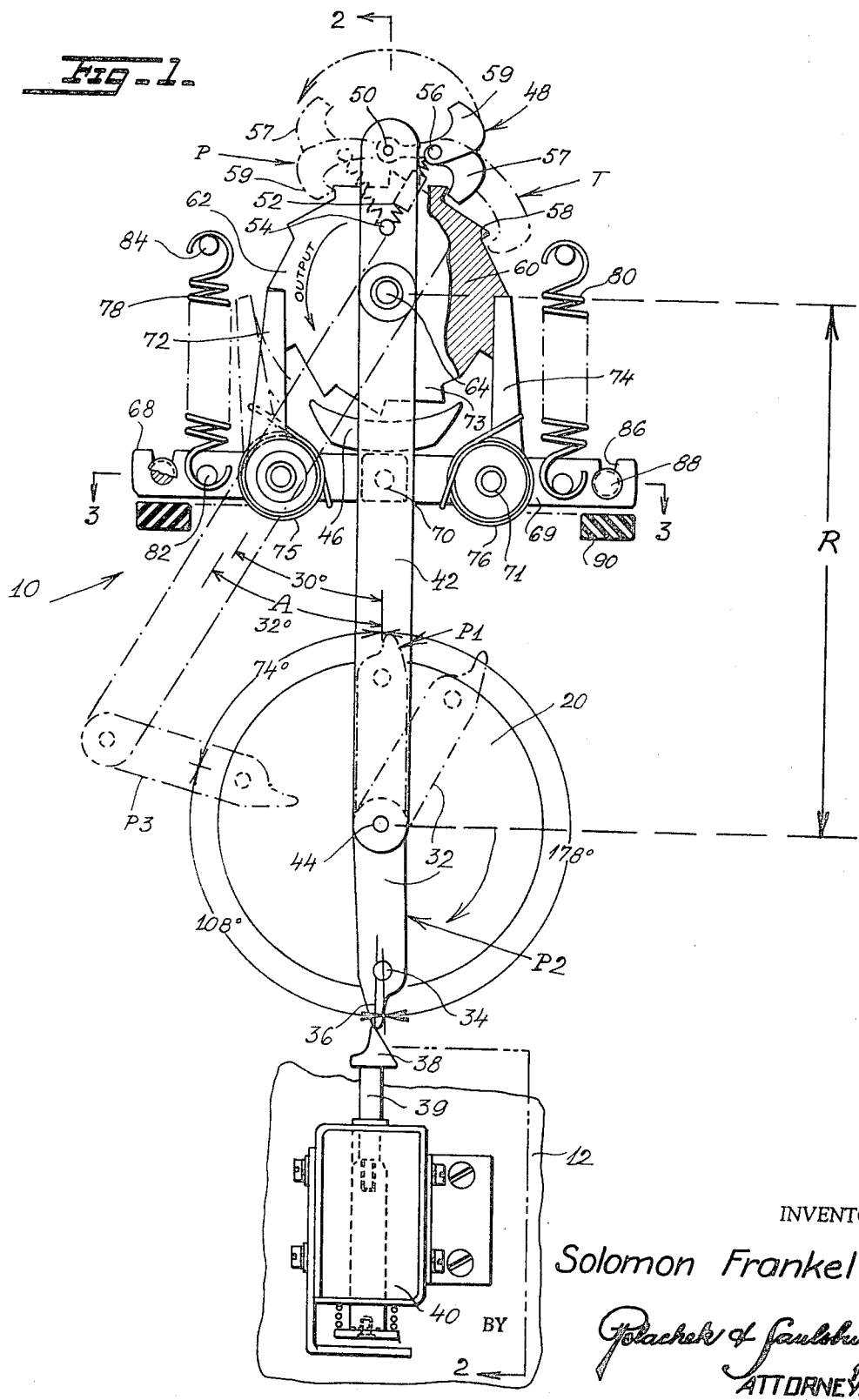

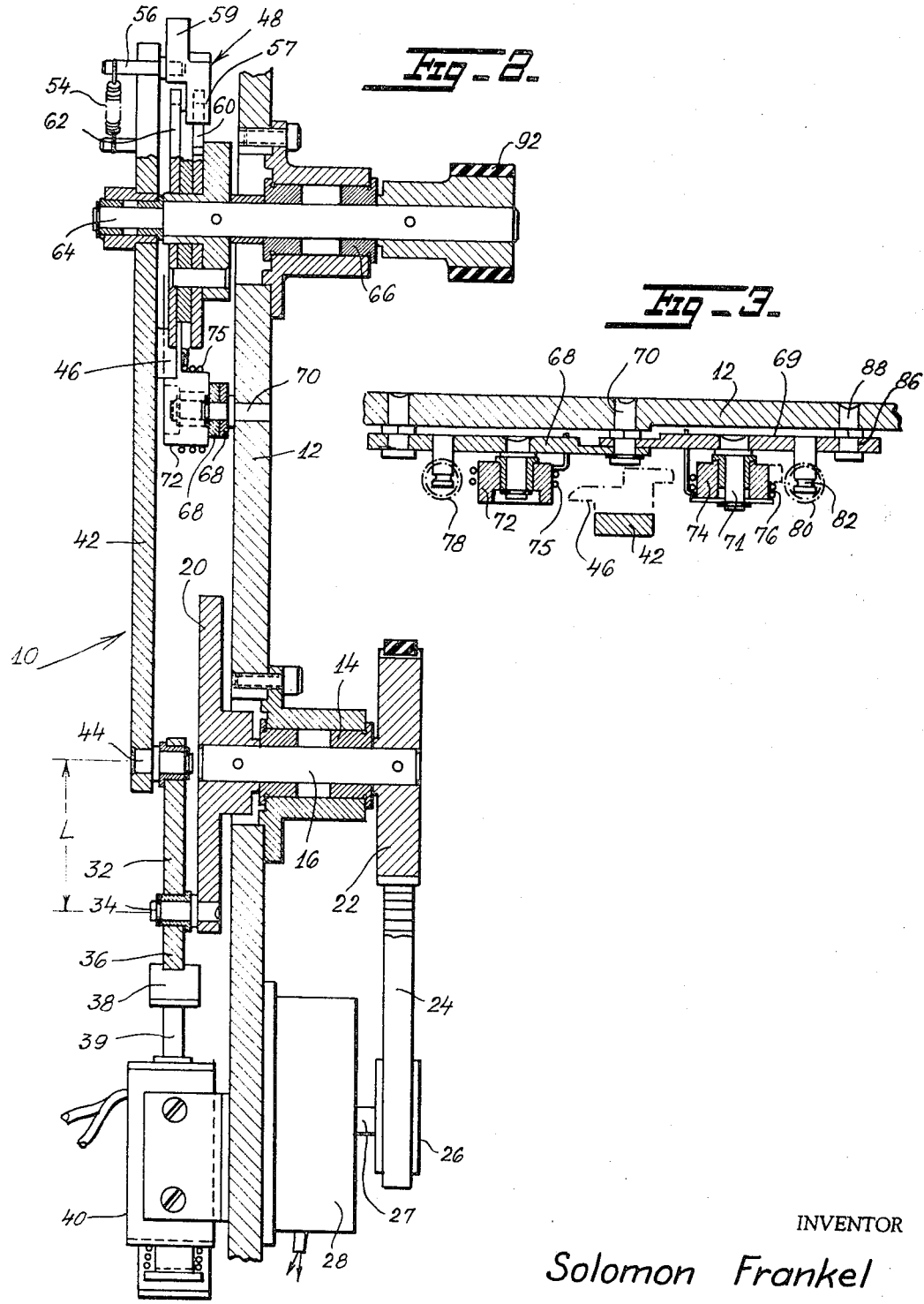

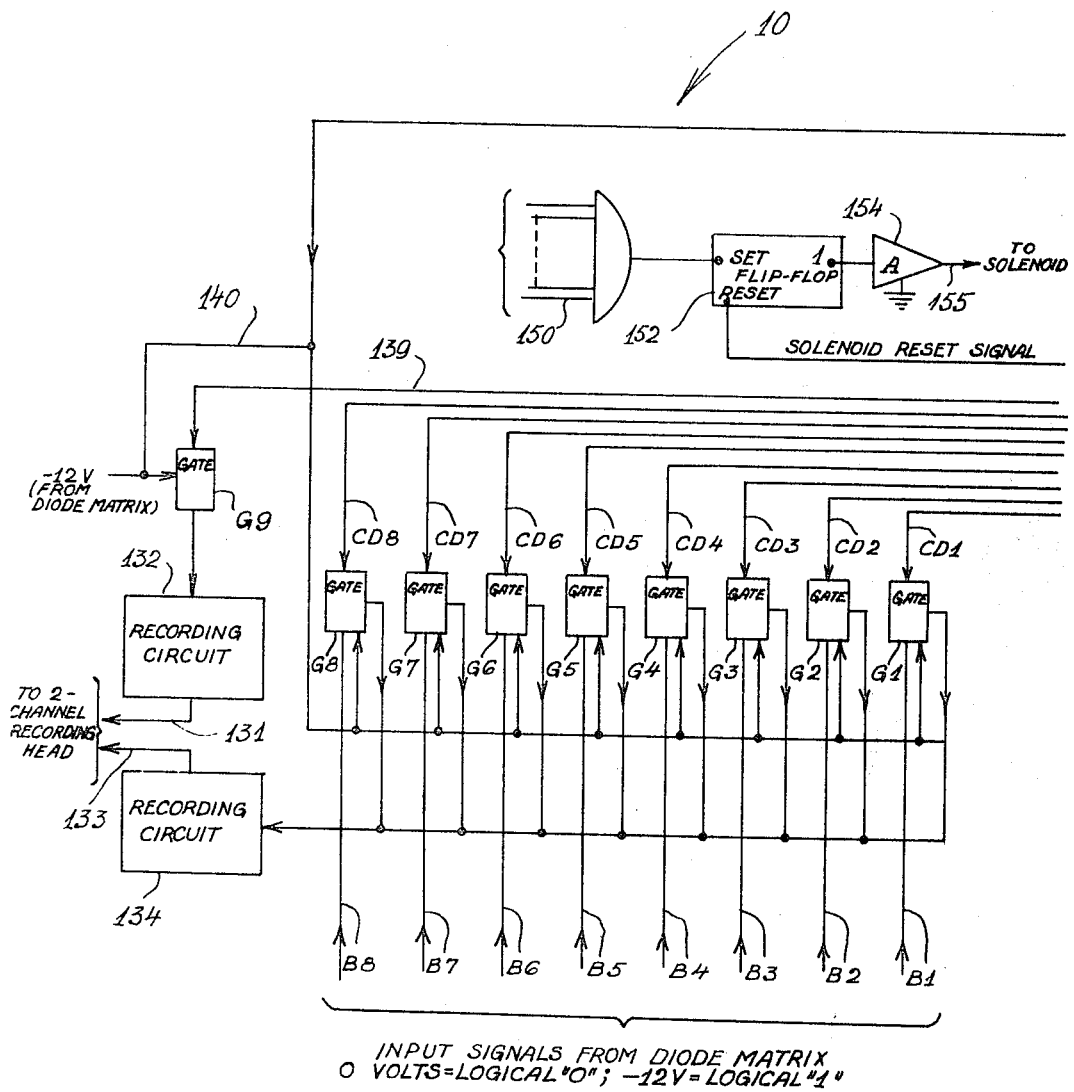

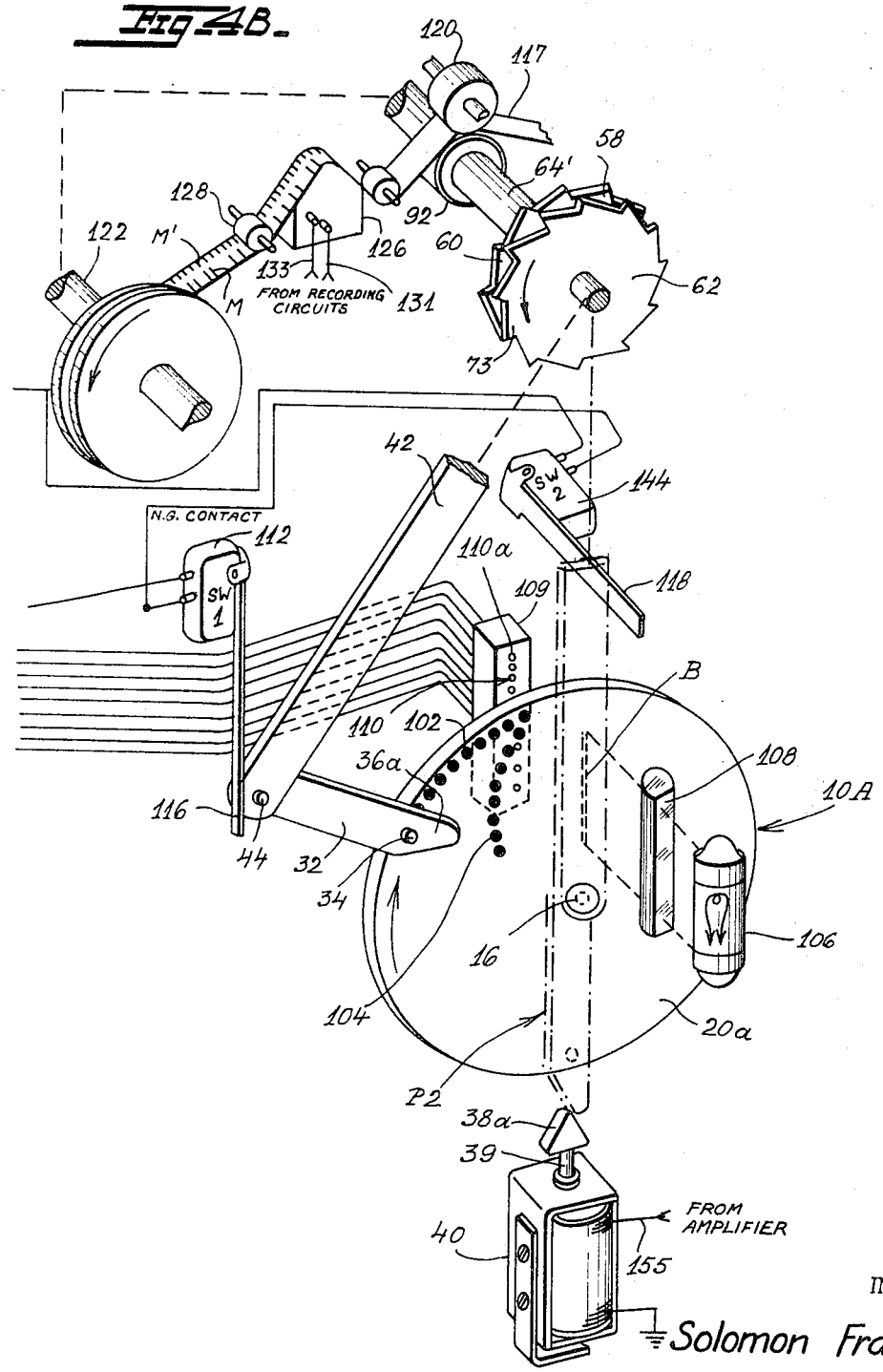

3,436,976
STEPPING MECHANISM
Solomon Frankel, 2455 Haring St.,
Brooklyn, N.Y. 11235
Filed Sept. 25, 1967, Ser. No. 670,319
Int. Cl. F16h 27/02
U.S. Cl. 74—143     9 Claims

ABSTRACT OF THE DISCLOSURE

The disclosure describes a stepping mechanism in which a double ratchet is stepped by an oscillating arm which is actuated each time a rotating actuating link encounters an interposed plunger of a solenoid. The solenoid is pulsed periodically to extend the plunger in the path of the rotating link. The oscillating arm carries a double reversible pawl for stepping the ratchet in opposite direction when the pawl is reversed and the direction of rotation of the actuating link.

---

The invention relates to an improved reversible stepping mechanism which is stepped by pulses applied to a controlling solenoid.

The mechanism employs basically a multielement linkage arranged in such a manner as to provide an oscillation motion through a predetermined angle ranging from 32° to 47° depending on the geometry of the parts and on the requirements of the user. Attached to the linkage is a drive or output ratchet and drive pawl for driving an output shaft unidirectionally. A pair of detent pawls engage the drive and stop ratchets to stop and hold the output shaft. Associated with the drive ratchet is a stop ratchet. A solenoid is employed to trigger operation of the linkage to drive the output shaft. This solenoid is electrically pulsed at the proper times during the operating cycles of the mechanism.

A constantly rotating drive motor drives an input link or disk and an actuating link in one direction. As long as the solenoid remains in the deenergized condition, the input and actuating links rotate about an oscillator output link normally disposed in stationary, neutral or resting position, and no stepping motion is possible at the output shaft. When the solenoid is energized, it moves an interposer into interference position in the path of the actuating link. As this link comes around and strikes the interposer, the actuating link pivots about its pivot point on the input link which in turn drives the output link laterally away from its neutral or resting position.

Once the output link is moved through a small angle the drive motor is effectively coupled to the output link. The input and actuating links then drive the output link through a predetermined angle and back again to its resting position.

The torque which can be transmitted by the output link at this point becomes zero. The input and actuating links are then effectively uncoupled from the output shaft and both the input and actuating links continue to rotate together with respect to the stationary output link until the next time when the solenoid is energized.

The coupling and uncoupling of the drive linkage to the output shaft is a function of the geometry of the linkage alone. This eliminates the need for a mechanical clutch. The output ratchet rectifies the oscillating motion of the output link so that the output shaft rotates in predetermined angular increments in a counterclockwise direction.

A stop pawl, antireverse pawl and spring loaded pivoted plate operate as a detent mechanism. As the output link is driven laterally, a cam carried by the output link pushes the stop pawl out of engagement with stop ratchet thus allowing the two ratchets to be turned on the return stroke of the output link. The spring loaded plate serves two purposes. It acts as a shock absorber because of high impact forces on the stop pawl, and it allows the output or drive ratchet to overtravel angularly a few degrees, so that the antireverse pawl can fall into position in engagement with a tooth of the output ratchet. This stops the output ratchet so that no output shaft motion can then occur in either direction.

The detent mechanism has several advantageous features. No torque is required to overcome its holding action as with spring loaded detents. This is an important consideration because the torque transmissibility of the linkage is at a minimum at the start and at the end of the stepping cycle. Also the positioning of the output shaft is more positive.

The drive pawl is a double reversible structure. By reversing the drive pawl, the stop ratchet operates as the drive or output ratchet and the output ratchet becomes the stop ratchet. Also the detent pawls reverse their functions so that the stop pawl acts as the antireverse pawl and the antireverse pawl acts as the stop pawl. When the drive pawl is reversed in position and the direction of rotation of the input and actuating links is reversed, reversal of direction of drive of the output shaft results.

The invention will be explained in further detail in connection with the drawings, wherein:

FIGURE 1 is a plan view, with parts broken away and parts in section of stepping mechanism embodying the invention.

FIG. 2 is a longitudinal sectional view taken on line 2—2 of FIG. 1.

FIG. 3 is a transverse sectional view taken on line 3—3 of FIG. 1.

FIGS. 4A and 4B taken together constitute a diagram of a digital recorder employing a stepping mechanism according to the invention, parts of the stepping mechanism being shown in perspective with other parts broken away.

Referring first to FIGS. 1–3 the stepping mechanism 10 includes a stationary mounting plate 12 on which is mounted a bearing 14. A shaft 16 is rotatably journaled in the bearing 14, and extends out of the mounting plate 12. On one end of shaft 16 is a disk 20 secured to the shaft and rotating therewith. The other end of the shaft 16 carries a sprocket 22 on which is entrained sprocket belt 24. The belt is engaged on drive sprocket 26 mounted on drive shaft 27 of a motor 28. The motor is supported on plate 12. The motor drives disk 20 continuously during operation of the mechanism.

Disc 20 serves as the first or input link in the stepping mechanism. A second link or actuation link has the form of a short arm 32 rotatably engaged on a pin 34 secured near the periphery of disk 20. The length L of arm 32 is substantially equal to the radius of pivot pin 34 on disk 20. Arm 32 has a short end finger 36 extending radially of disk 20 for contact with interposing cam 38 at the outer end of plunger 39 of a solenoid 40. The solenoid is mounted on mounting plate 12.

An arm 42 which is pivotally attached at one end to shaft 64 and the other end of arm 32 at pin 44, serves as a third link or output link of the mechanism. The arm 42 carries an arcuate bar cam 46 which extends outwardly of the edges of arm 42. At the other end and outer end of arm 42 is a generally T-shaped reversible double pawl 48. This ratchet drive pawl is pivotally attached by pin 50 to arm 42. An over center coil spring 52 is engaged between pins 54 and 56 on the arm 42 and pawl 48 to bias the pawl downwardly clockwise or counterclockwise as viewed in FIG. 1. The pawl 48 has one L-shaped hook 58 disposed to engage teeth 58 of output ratchet 60. The other L-shaped hook 59 of the pawl extends upwardly in the plane of associated stop ratchet 62. Either hook 57 or hook 59 can be disposed in operative positions. When the pawl is located to the right arm 42 as shown in solid lines in FIG. 1, then hook 59 extends upwardly and is deactivated while hook 57 is operative. When the pawl is turned on pin 50 to the dotted line position on the left of arm 42, then hook 59 is engageable with ratchet 62 while hook 57 extends upwardly and is deactivated. For purposes of illustration, each ratchet is shown with twelve teeth.

Ratchets 60 and 62 are both secured to output shaft 64 rotatably journaled in bearing 66 on wall 12. Arm 42 is rotatable on but is not secured to output shaft 64. Two cross bars or plates 68 are pivotally secured by pin 70 to mounting plate 12 between the arm 42 and plate 12. Plates 68 are located just below cam 46. Two detent pawls 72 and 74 are pivotally mounted on pins 71 on plates 68 just beyond opposite lateral edges of arm 42. Stop pawl 72 is disposed on one side of plate 68 to engage with teeth 73 of stop ratchet 62. Antireverse pawl 74 is disposed on the other side of plate 69 to engage with teeth drive ratchet 58 of pawl 60. Torsion springs 75, 76 engaged between the pawls 72, 74 and plates 68 and 69 bias the pawls inwardly toward their respective ratchets 62, 60. Shock absorbing springs 78 and 80 are engaged between pins 82 near opposite ends of plates 68 and 69 and pins 84 mounted on plate 12. Slots 86 at opposite ends of plates 68 and 69 receive guide pins 88 mounted on plate 12. Just below opposite ends of plates 68 and 69 are resilient shock absorbing pads 90 supported by plate 12. A capstan 92 on the other end of shaft 64 is used for taking off the stepwise drive motion of output shaft 64.

The mechanism as shown in FIG. 1 in solid lines is arranged to effect counterclockwise motion of output shaft 64 in angular increments of steps of 30° each. The pawl 48 is disposed as shown in FIGS. 1 and 2, with hook 57 engaged with a tooth of ratchet 60. Solenoid plunger 39 is shown extended which occurs when the solenoid is externally energized. When the plunger is retracted, both the disk 20 and arm 32 rotate continuously in a clockwise direction. Arm 42 is then stationary and vertical while pin 44 is axially aligned with shaft 16. Stop pawl 72 is engaged with stop ratchet 62; antireverse pawl 74 is engaged with drive ratchet 60. Thus output shaft 64 is stationary. Now suppose solenoid 40 becomes energized during the dwell period of 178° of arm 42. This results in the extension of plunger 39 so that cam 38 is slidably engaged by finger 36 of arm 32 when it reaches solid line position P2. Upon engaging cam 38, the arm 32 will turn counterclockwise on pin 34 while disk 20 continues to rotate. When arm 32 contacts cam 38 it displaces the lower part of arm 42 to the left. When arm 42 is turned through 32° cam 46 moves fully to the left as viewed in FIG. 1 and pushes pawl 72 clear of ratchet 62. Arm 32 is then positioned P3. At the same time the hook 57 of pawl 48 turns clockwise 32° on stationary ratchet 60 a distance 2° beyond one tooth to position T indicated by dotted lines in FIG. 1. As arm 42 assumes a vertical position, arm 32 reaches position P1. Hook 57 completes its movement of pulling ratchet 60 and shaft 64 to the left or counterclockwise just one step through an angle of 30°. At the same time pawl 72 snaps back to reengage ratchet 62.

Arm 42 remains stationary in its neutral position shown in solid lines in FIG. 1. The solenoid which became deenergized after finger 36 separated from cam 38, now becomes energized again to start another cycle of operation, so that cam 38 again awaits the arrival of arm 32 at position P2.

If clockwise rotation of output shaft 64 is desired, then disk 20 and arm 32 will be rotated in counterclockwise direction by motor 28. Pawl 48 will be reversed or turned to the dotted line position P to engage hook 59 with a tooth 58 of ratchet 62. This ratchet now becomes the antireverse ratchet and ratchet 60 becomes the stop ratchet. The same operations will take place as before but in opposite direction. Pawl 74 will now operate as the stop pawl while pawl 72 will operate as the antireverse pawl.

Cam 46 will now displace pawl 74 to permit clockwise rotation of ratchets 60, 62 and output shaft 64.

The basic mechanism described can be adapted to a straight intermittent or indexing motion, similar to a geneva drive with long dwell period. The incremental angular rotation of the arm 42 away from its rest position depends on the dimensions of the several parts. In general, for optimum operation, the ratio of R to L should be no greater than four to one; where L is the operating length of both the input and actuator links, i.e., the effective radius of pivot pin 34 on disk 20 and the lever length of arm 32; and where R is the operating length of the output link, i.e., the effective lever length of arm 42. The angular displacement, i.e., angle A of the arm 42 is arbitrary as is length R and L can be determined by the relationship: $L = \sin \frac{1}{2} A (R)$; and as pointed out above the length R should not be more than four times the length L; so that the sin ½A will not be less than 0.25. The center of rotation of disk 20 in this arrangement is located a distance equal to length R from the center of rotation of output shaft 64. The stepping mechanism can be applied to incremental digital tape recorders, film drives, paper tape readers, paper tape punches, printing machines, and other uses in business, instrumentation, communications and industrial fields. As one example, the invention is shown employed in a digital tape recording syster 100 in FIGS. 4A and 4B to which reference is now made.

In system 100, stepping mechanism 10A is generally similar to stepping mechanism 10 shown in FIGS. 1–3, and corresponding parts are identically numbered. Disk 20a which is the input link of the stepping mechanism is transparent and has a series of circumferentially disposed opaque spots or dots 102. Radially and circumferentially spaced spots or dots 104 extend counterclockwise from the leading end of spots 102. The disk 20a rotates continuously in clockwise direction. A lamp 106 is continuously lighted so that a linear beam B is cast through cylindrical lens 108 and radially of disk 20a. When arm 42 which is the output link is disposed vertically in the dotted line rest position shown in FIG. 4B the light is cut off from disk 20a.

An array 109 of switches is controlled respectively by photoelectric cells 110 disposed behind disk 20a in alignment with beam B. The cells are disposed so that the outer spots 102 pass across the line of sight of uppermost cell 110a. The other spots 104 pass in turn across the lines of sight of the other lower cells 110, respectively.

The system includes two switches 112 and 114 which have arms 116 and 118 respectively actuated by the lower end of arm 42 at the left and right ends of its oscillatory motion.

A magnetic tape 117 passes between capstan 92 and an idler pressure roller 120 so that the tape moves only when the shaft 64' is stepped incrementally. Capstan 92 and shaft 122 of takeup reel 124 are operatively connected together to move in synchronism. The connection is such that tape is tensioned at all times as it passes under guide roller 125 over tape head 126 and under guide roller 128. The tape head has two recording elements 130 which are energized respectively via lines 131, 133 by recording circuits 132 and 134 as shown in FIG. 4A. The recording circuit 132 is actuated by pulses received from coincidence gate G9. The recording circuit 134 is actuated by pulses received from coincidence gates G1–G8. The gates G1–G8 are triggered by input signals received on lines B1–B8 a diode matrix (not shown). When coincidence pulses are received on lines CD1–CD8 respectively from the lower eight cells 110 output pulses M are recorded magnetically on tape 117.

Timing pulses M' are recorded on tape 117 when recording circuit 132 is pulsed. This circuit is pulsed each time coincidence pulses are applied to gate G9 via lines 139. Line 139 is in circuit with a switch 144 which is closed each time arm 42 reaches the right end of its travel. When the arm 42 is displaced from its rest position and spots 102 are passing between cell 110a and the light beam B the light of this cell is cut off. A series of pulses thus pass on line 139 to gate G9 to trigger the recording circuit 132. Signal pulses are applied at random on lines 150 from a keyboard to actuate solenoid 40. The pulses pass through a flip-flop circuit circuit 152 which pulses the solenoid via amplifier 154 and line 155. Input pulses on lines 150 to "OR"gate set the flip-flop. The flip-flop is reset by pulses received via switch 112 and line 156 when the arm 42 is reaching the maximum left displacement shown in solid lines in FIG. 4B.

In system 100, switch 144 provides a blocking signal to prevent inputs from the diode matrix from entering the recording circuits until a tape advance cycle is initiated. This cycle is started when arm 42 is moved laterally from its rest position at the end of the dwell period when arm 32 reaches cam 38a at position P2. The system is arranged so that floating signals are derived on lines CD1–CD8 when the cells 110 are clocked off from light to actuate their associated switches 109. When coincidence signals are received at zero volts on lines B1–B8 and lines CD1–CD8 output signals at zero volts (logical "0") will be applied to the recording circuit 134. When instead coincidence signals of −12 volts are received on lines B1–B8 and floating signals from CD1–CD8, output signals of −12 volts (logical "1") will be applied to the recording circuit. In the arrangement of the system as shown, the switches 109 allow an input signal from the diode matrix to enter the recording circuit 132, which records timing pulses M' on the tap switches 109 allowing signals B1–B8 in sequence to enter recording circuit 134 from the diode matrix, recording data pulses M on the tape. The stepping mechanism is shown in FIG. 4B at the start of the encoding and advance portion of the recording cycle. The system thus accomplishes serial binary character recording synchronized with incremental tape advance.

It will be apparent to those skilled in the art that the stepping mechanism is applicable to other incremental drives, such as a combination film advance and shutter mechanism of a motion picture camera, etc.

While I have illustrated and described the preferred embodiments of my invention, it is to be understood that I do not limit myself to the precise construction herein disclosed and that various changes and modifications may be made within the scope of the invention as defined in the appended claims.

I claim:

1. A stepping mechanism, comprising a support, an output shaft rotatably carried by said support, two ratchets mounted on said shaft to rotate therewith, said ratchets having equally spaced teeth directed in opposite directions, an output link oscillatably mounted on said shaft, a drive pawl pivotally carried at one end of said link to engage the teeth of one of the ratchets to turn the shaft stepwise in one direction; detent pawls engageable with the teeth of the ratchets respectively to prevent rotation thereof in any direction, and cam means carried by said output link to displace one of the detent pawls engaged with the other ratchet to permit the drive pawl to turn the ratchets in said one direction during the return stroke of oscillation of said output link.

2. A stepping mechanism as recited in claim 1, further comprising an actuator link connected at one end to the other end of the output link, a continuously rotatable input link, said actuator link being pivotally connected near its other end to the input link to rotate therewith, and means for pivoting the actuator link at a point in its rotation with the input link for oscillating the output link, whereby said output link is stationary and centered in its oscillator path prior to displacement by said actuator link.

3. A stepping mechanism as recited in claim 1, wherein the last named means is a solenoid having a plunger displaceable into the path of said actuator link when the solenoid is periodically energized for turning the actuator link to start the oscillatory motion of the output link.

4. A stepping mechanism as recited in claim 1, further comprising a plate pivotally supported by said support, said detent pawls being pivotally supported by said plate and spring biased toward the teeth of the ratchets respectively, and shock absorbing pads disposed near ends of said plate to absorb impacts on the detent pawls at the ends of stepwise movement of the output link and incremental angular movements of the output shaft and ratchets.

5. A stepping mechanism as recited in claim 1, wherein said drive pawl is a reversible member with two hooks, one of said hooks being engaged with said one ratchet to turn the ratchets and ouput shaft in said one direction while the other hook is deactivated, whereby when the drive pawl is reversed on the output link the other hook is engaged with the other ratchet to turn the ratchets and output shaft in the opposite direction while said one hook is deactivated.

6. A stepping mechanism as recited in claim 2, wherein said drive pawl is a reversible member with two hooks, one of said hooks being engaged with said one ratchet to turn the ratchets and output shaft in said one direction while the other hook is deactivated, wherein when the drive pawl is reversed on the output link, and the direction of rotation of the input and actuator links is reversed the other hook is engaged with the other ratchet to turn the ratchet and output shaft in the opposite direction while said one hook is deactivated.

7. A stepping mechanism as recited in claim 6, wherein the means for pivoting the actuator link is a solenoid having a plunger displaceable into the path of said actuator link when the solenoid is periodically energized for turning the actuator link to start the oscillatory motion of the output link.

8. A stepping mechanism as recited in claim 7, further comprising plates pivotally supported by said support, said detent pawls being pivotally supported by said plates and spring biased toward the teeth of the ratchets respectively, and shock absorbing pads disposed near ends of the said plate to absorb impacts on the detent pawls at the ends of stepwise movement of the output shaft and ratchets.

9. A stepping mechanism as recited in claim 8, wherein said input link is a circular disk, another shaft supported by said support, said disk being rotatably mounted on and rotated by said other shaft, and a motor operatively connected to and continuously driving said other shaft to rotate the input and actuator links continuously.

References Cited

UNITED STATES PATENTS

| 1,565,336 | 12/1925 | Seufert | 74—128 |
| 2,426,715 | 9/1947 | Tatter | 74—143 |
| 2,917,933 | 12/1959 | Harris | 74—575 |
| 2,973,898 | 3/1961 | Reynolds | 74—126 |
| 3,036,474 | 5/1962 | Perez | 74—143 |

FOREIGN PATENTS 931,918 8/1955 Germany.

FRED C. MATTERN, Jr., *Primary Examiner.*

W. S. RATLIFF, Jr., *Assistant Examiner.*

U.S. Cl. X.R.

74—129, 576